July 8, 1941. A. M. R. KARLSTRÖM 2,248,177
APPARATUS FOR PURIFYING WATER
Filed May 10, 1937 2 Sheets-Sheet 1
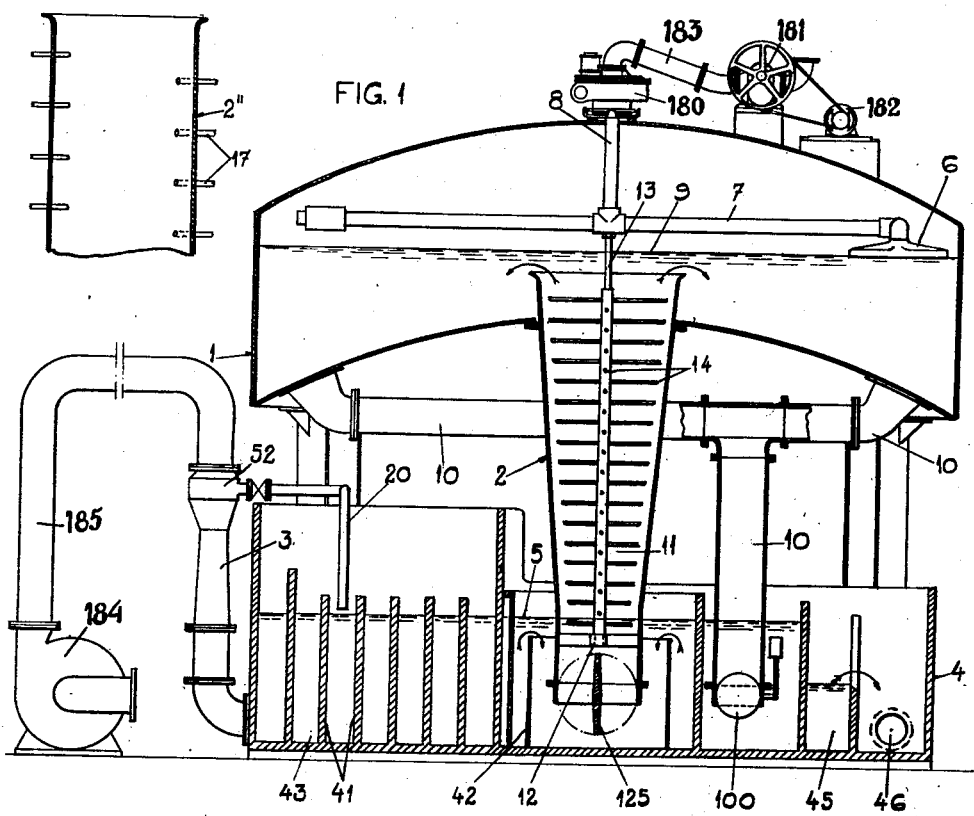
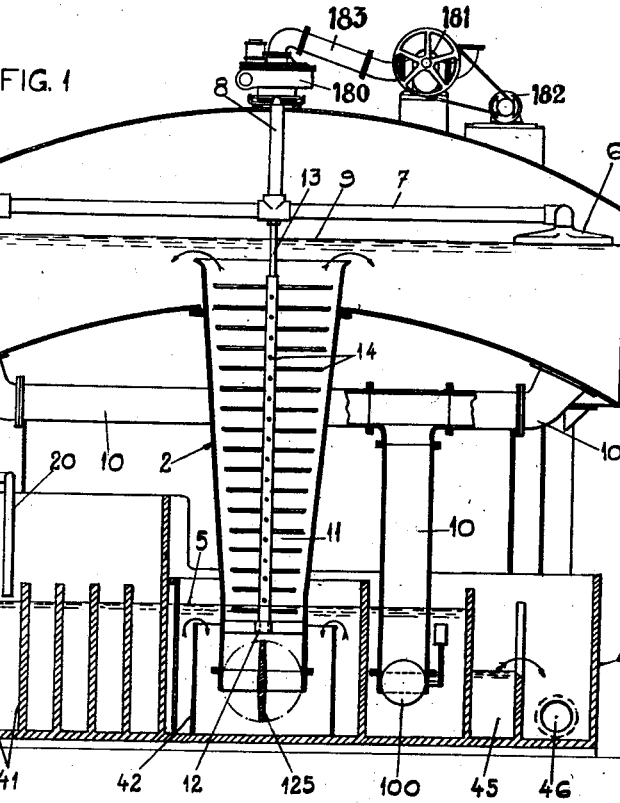
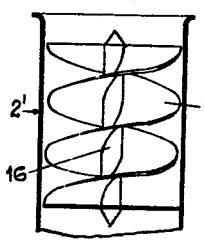
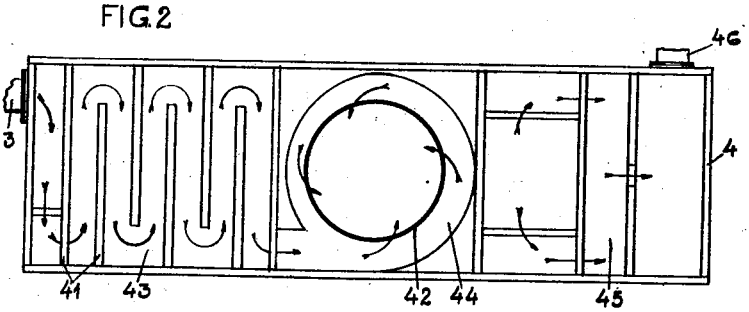
INVENTOR.
ADOLF M. R. KARLSTRÖM
BY William C. Linton
ATTORNEY.

July 8, 1941. A. M. R. KARLSTRÖM 2,248,177
APPARATUS FOR PURIFYING WATER
Filed May 10, 1937 2 Sheets-Sheet 2
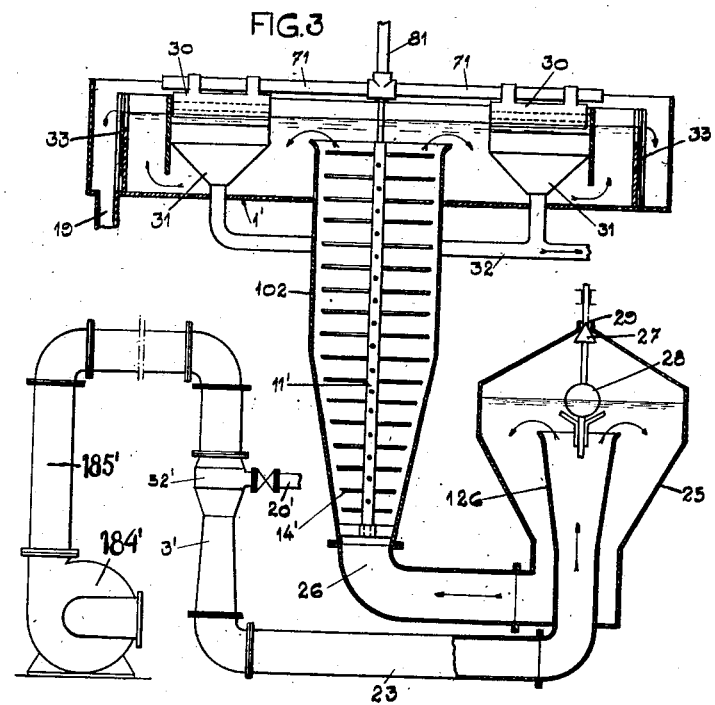
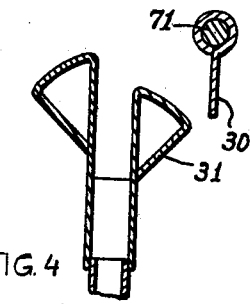
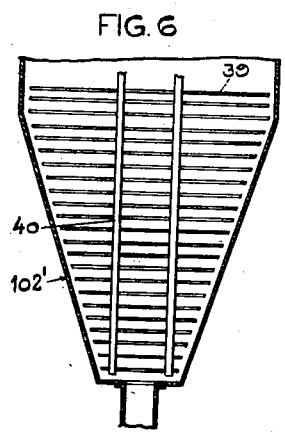
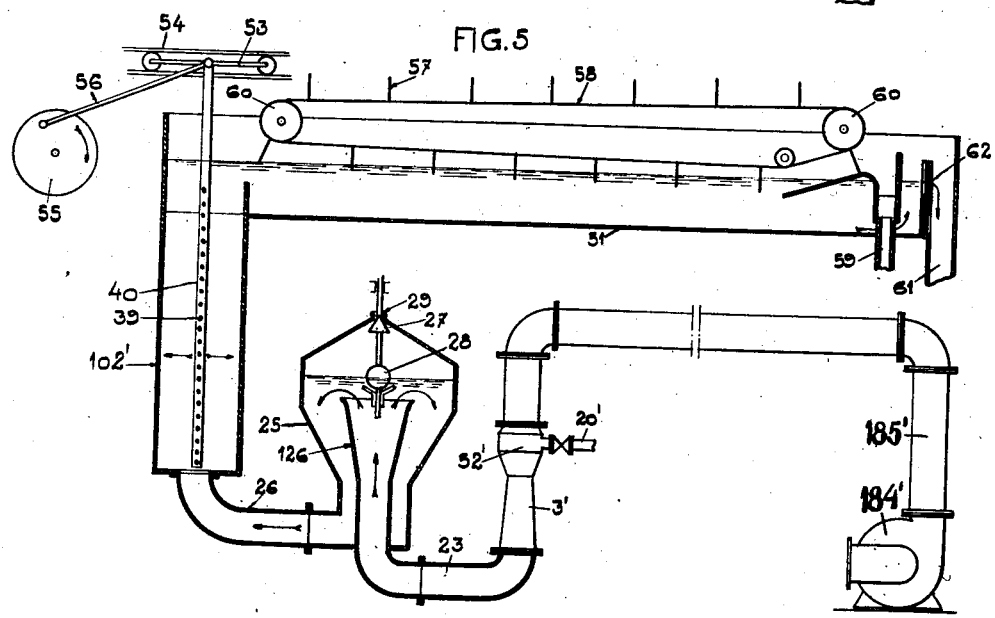
INVENTOR.
ADOLF M. R. KARLSTROM
BY William C. Linton
ATTORNEY.

Patented July 8, 1941

2,248,177

UNITED STATES PATENT OFFICE 2,248,177

APPARATUS FOR PURIFYING WATER

Adolf Magnus Rupert Karlström, Goteborg, Sweden

Application May 10, 1937, Serial No. 141,839
In Sweden May 11, 1936

8 Claims. (Cl. 210—53)

The present invention relates to methods and apparatus for purifying water, particularly waste or so-called "white" water of paper, cellulose, wood-pulp and textile-mills in which the particles of the liquid are brought to the surface of the water by means of air or gas bubbles in a container or tank from which they are then removed. The invention is applicable to methods in which the air or gas is introduced into the water under atmospheric pressure, and the flotation of the particles takes place under reduced pressure, and also those in which the gas or air is introduced into the water under a pressure above atmospheric pressure and the flotation of the particles takes place under atmospheric pressure. In both methods the water rising to the separating zone of the tank is subjected to a successively reduced pressure. As a rule, the particles in the water are too small to give a good hold or seat to the air or gas bubbles, because of which it will be necessary to floc the particles together in larger units in order to obtain a better air or gas binding capacity. This flocculation is effected by means of alum, animal glue and resin glue, and an alkali also may be used if required. Due to their air- or gas-charge the particles or, more properly, the flocs formed by them, will rise in the water, and the acceleration of same will be rather great due to the fact that the charge of gas or air will be increased successively. As a consequence, the flocs will often possess a direction of movement that deviates from that of the flow of the liquid. Detrimental currents in the liquid are thus produced which will result in the flocs being deprived of carrying air or gas charges. If the inlet of the tank is directed upwards, and the total surface of the flocs and also their rising velocity is great, the flocs will act as a piston upon the water, and will produce in certain parts of the inlet tube upward currents in the water. On arriving at the surface of the liquid in the tank, these currents will be deviated in horizontal directions, and they will then carry away part of the pulp that has already risen or is rising to the surface. Part of the pulp will accordingly be carried away with the "purified" water. In the ascending tube or conduit the upwardly directed currents of the liquid in other parts of the tube will release descending currents of the liquid counteracting the rising of the flocs. As a result of the rubbing hereby produced, the flocs will get broken so that minor flocs are formed which are deprived a great deal of the air or gas bubbles contained in the original flocs, and will become too heavy to rise.

The invention has for its object to remove these drawbacks so that the water will be purified in a high degree and the efficiency of the method and apparatus in the recovering of the particles from waste water of the kind above mentioned will be relatively high.

Other objects of the invention will be made clear by the following description with reference to the accompanying drawings illustrating some embodiments of the apparatus for carrying out the method.

Figure 1 shows a vertical section of one form of a water purifying apparatus, Figures 1a and 1b are sections of the inlet tube of the separating tank according to different modifications, Figure 2 is a plan view of a container belonging to the apparatus of Figure 1 and serving for removal of air not dissolved in the water to be purified, Figure 3 is a vertical section of another form of the apparatus, Figure 4 is a detail view of this apparatus, Figure 5 is a vertical section of still another form of apparatus, and Figure 6 is a vertical section of an inlet conduit of this third apparatus.

With reference to Figure 1, I denotes a closed separating container or tank, in which the water to be purified (for instance "white" or waste water of paper, cellulose, wood-pulp and textile mills) is introduced through a substantially vertical central tube 2 which forms the inlet conduit of the tank I and may be of conical shape. The lower end of this tube may be closed by a valve or shutter 125 when the apparatus is not in operation. The water intermingled with particles, such as fibres and the like, flows, after air has been introduced into the water by means of an ejector 52 with suction pipe 20, through a conduit 3 to which the water has been supplied by a pump 184 through a conduit 185 to an open container 4 positioned below the separating tank I and into which the tube 2 extends down below the surface 5 of the liquid in the container 4. Through the pipe 20 also foam will be sucked from the container 4. One compartment 43 of this container, to which the inlet conduit 3 is connected, is provided with baffles 41 whereby the water will have to flow a long way in the open container 4 before entering into the inlet tube 2. The water passes from the compartment 43 through a helical passage 44, the inner side of which is formed by a sleeve 42 surrounding the lower end of the tube 2. By the long passage of the water in the open container 4 the gas or air not dissolved in the water or free air or gas bubbles will escape from the water which, under atmospheric pressure, will be practically free from such bubbles and will be saturated with air or gas dissolved before entering into the ascending conduit or tube 2. The particles which have risen to the surface 9 in the tank 1 are removed by means of a suction nozzle 6 upon the end of a hollow arm 7 connected with a hollow vertical shaft 8 which is driven by means enclosed within housing 180, for example, a motor driven worm gear. By means of this shaft the nozzle is moved in a circular path over the water surface 9 in the tank 1. The tube or hollow shaft 8 is connected by a conduit 183 with a suction pump 181 which is driven by a motor 182 and which continuously sucks off the pulp and maintains the reduced pressure within the separating tank 1. The liquid in conduit 2 is raised into said tank 1 due to the atmospheric pressure upon said liquid at the base of said conduit 2 and the reduced pressure upon said liquid within the tank 1. The purified water flows continuously through the conduit 10 from the lower portion of the tank into a second compartment 45 of the container 4 which compartment is connected with a discharge conduit 46. The discharge end of the conduit 10 may be closed by a shutter 100.

In the tube 2, an agitating device is provided for reducing the augmentation of the velocity of the gas- or air-charged particles of flocs in the tube 2. According to the embodiment shown, the agitating device consists of a vertical shaft 11 carrying a number of arms 14. The lower end of the shaft 11 is journalled in a stationary bearing 12, the upper end of the shaft being connected with the driving shaft 8 by means of a suitable connecting member 13. The shaft with the arms, which if desired may have different lengths, forms an agitator which with the suction nozzle rotates slowly (for instance one or two revolutions per minute). When the water freed from free air or gas bubbles enters the tube 2, the pressure will be successively reduced in the upward flow of the water, and the air dissolved in the water will be separated in the form of small air bubbles upon the particles. The number, size and lifting power of the air-bubbles will be increased according to the rising of the bubbles and hereby the flocs, to which the bubbles adhere, will obtain a vertical, very accelerated movement in relation to the surrounding water. The device 11, 14 has for its object to prevent air-charged flocs moving uninterruptedly through a long path in a vertical direction. By means of the slowly rotating device the flocs will be exposed to incessant disturbances, and thus the beginning rising velocity in relation to the water will be stifled before it mounts to a detrimental size. Thus, the final result will be that the air-charged particles in spite of their tendency to rise will follow the water in its upward flow with substantially the same velocity as that of the surrounding water. The formation of the flocs is not disturbed by the slow agitation but, on the contrary, it is promoted thereby. As above mentioned, the small particles are flocculated by means of alum, glue and resin size.

Figure 1a shows a double-threaded screw or worm 15 upon the vertical axis 16 within the ascending tube 2' and extending from the lower end and along a portion of the height of the tube 2'. This screw or worm has for its object to give the water rising in the tube a rotary movement. Hereby the capacity of the air-charged particles or flocs to accelerate their movement in vertical direction is reduced. Such a rotary movement of the flow of water passing through the ascending tube 2" may also be effected by means of nozzles 17 for a fluid inserted in the wall of the tube and acting in a tangential direction, as shown by Figure 1b.

Figure 3 illustrates a water purifier, with an open separating tank 1'. The water to be purified is supplied through a conduit 3' with ejector 52' with air suction pipe 20'. The water thus mixed with air (or other gas) is forced by pump 184' through a conduit 185' to a conduit 23 into a closed tank 25 which by means of a conduit 26 is connected with the lower end of the vertical tube 102 containing a rotatable agitator 11', 14' of similar kind as that of Figure 1.

It is of very great importance that any air or gas not dissolved in the water is removed therefrom, before the water enters into the ascending tube, as the action of the agitator 11', 14' or corresponding means would be seriously disturbed by the rising of large air or gas bubbles. In the use of an open separating tank the tank for the removal of air not dissolved should be closed. In Figure 3 the conduit 23 extends up into the tank 25 with a widening portion 126. The air-bubbles accompanying the water will separate to the space in the upper portion of the tank 25 and form here an air-cushion. By the aid of an air relief valve 27 controlled by a float 28 and adapted to control an opening 29 at the top of the tank 25, the liquid in the tank is held at a constant level. If an addition to the liquid of alum, glue or the like takes place, it may be effected immediately before, after or while the liquid flows through the air-removing tank 25.

In the embodiment shown by Figure 3 the floated particles are removed by means of scrapers 30 depending from the arms 71 and pivoted thereto. In their circular movement with the driving shaft 81 which can be driven in a manner similar to the arrangement disclosed in Figure 1 of the drawing for driving shaft 8 of that figure, the scrapers move the pulp to boxes or pockets 31 (see also Figure 4) whence the material is discharged through a conduit 32. The purified water flows over adjustable overflows or weirs 33 to the discharge conduit 19.

The agitating device 11', 14' fulfils the same function as that described in respect of Figure 1.

In the embodiment of Figure 5, the parts 20', 52', 3', 23, 25, 126, 27, 28, 29, 26 are substantially similar to and function in a like manner as the corresponding parts described with reference to Figure 3. Also, a pump 184' can be used for supplying liquid to be treated under pressure through conduit 185' to the ejector 52' and from there by conduit 23 to tank 25. Also in Figure 5 the separating tank 51 is open and has an oblong or rectangular form. The inlet tube 102' is provided beneath one short end of this tank and the upper end thereof has substantially the same width as the tank 51 and tapers downwardly. In this prismatically shaped inlet tube, an agitator of a shape suited to the prismatic shape is provided (see also Figure 6), consisting, for instance, of horizontal rods 39 placed above each other, the lengths of which are reduced downwards and are connected by one or more rods 40. The lattice-work thus formed depends from a carriage 53 which is movable in a horizontal guide-way 54. By a driven wheel 55 and a connecting rod 56 the lattice-work 39, 40 receives a reciprocating movement in the tube 102' thereby forming obstacles for the movement of the flocs or particles so that these are prevented from increasing their vertical velocity.

The floated particles are removed, in known manner, by means of scrapers 57 carried by an endless belt 58 moved by wheels 60, above the water surface in the separating tank 51, said scrapers conveying the pulp to a discharge conduit 59 while the purified water over an adjustable overflow 62 flows to the discharge tube 61.

The invention is not limited to embodiments, described but I want to be free to vary the details thereof without departing from the spirit of the invention.

What I claim is:

1. An apparatus for purifying water comprising means for conveying the water to be purified, means for introducing gas into the water to be purified in said conveying means, a tank connected to said conveying means, means in said tank for removing the gas not dissolved in the water, an ascending conduit for said water connected to said tank, a separating tank into which the top end of the ascending conduit opens, movable means in the ascending conduit adapted to reduce the acceleration of movement of ascending gas charged particles, movable means for removing the particles floated to the water surface in the separating tank and means for removing the clear liquid from said separating tank.

2. An apparatus for purifying water comprising in combination means for introducing gas into the water to be purified, an ascending conduit for said water, a separating tank into which the top end of the ascending conduit opens, rotatable means within the ascending conduit adapted to reduce the acceleration of movement of ascending gas charged particles, means for removing the particles floated to the water surface in the separating tank and means for removing the clear liquid from said separating tank.

3. An apparatus for purifying water comprising in combination means providing a passage for said water, means for introducing gas into the water to be purified within said passage providing means, means after said introducing means for removing the gas not dissolved in the water within said passage providing means, an ascending conduit connected to said passage providing means, a separating tank into which the top end of said ascending conduit opens, means within the ascending conduit adapted to reduce the acceleration of movement of ascending gas charged particles, means for continuously removing the particles floated to the water surface in the separating tank, and means for continuously discharging purified water from said separating tank.

4. An apparatus for purifying water comprising in combination means for introducing gas into the water to be purified, means providing a passage for said water, a closed tank for reception of said water after gas has been introduced therein connected to said passage providing means, a valve controlled opening in said tank for the escape of gas not dissolved in the water, an ascending conduit communicating with said closed tank and receiving the water from the latter, a separating tank into which the top end of the ascending conduit opens, means in the ascending conduit adapted to reduce the acceleration of movement of ascending gas charged particles, means for removing the particles floated to the water surface in the separating tank and means for continuously discharging purified water from said separating tank.

5. An apparatus for purifying water comprising in combination a conduit for said water, means for introducing gas to the water within said conduit, an open tank connected to said conduit, means within said tank creating an extended course for the water flowing through said tank, an ascending conduit having its lower end within said tank, rotatable means within said ascending conduit adapted to reduce the acceleration of movement of ascending gas charged particles, a closed separating tank into which the top end of said ascending conduit opens, means within said separating tank reducing the pressure therein and withdrawing the particles floated to the water surface therein and outlet means in the bottom of said separating tank for removing the clear liquid therefrom.

6. An apparatus for purifying water comprising in combination a conduit for said water, means for introducing gas to the water within said conduit, a tank connected to said conduit, an ascending conduit having its lower end within said tank, rotatable arms within said ascending conduit adapted to reduce the acceleration of movement of ascending gas charged particles, a closed separating tank into which the top end of said ascending conduit opens, means within said separating tank reducing the pressure therein and withdrawing the particles floated to the water surface therein and outlet means in the bottom of said separating tank for removing the clear liquid therefrom.

7. An apparatus for purifying water comprising in combination a conduit for said water, means for introducing gas to the water within said conduit, a tank connected to said conduit, an ascending conduit having its lower end within said tank, means the entire length of said ascending conduit ejecting liquid across the path of the ascending liquid in said ascending conduit, a closed separating tank into which the top end of said ascending conduit opens, means within said separating tank reducing the pressure therein and withdrawing the particles floated to the water surface therein and outlet means in the bottom of said separating tank for removing the clear liquid therefrom.

8. An apparatus for purifying water comprising in combination a conduit for said water, means for introducing gas to the water within said conduit, a tank connected to said conduit, an ascending conduit having its lower end within said tank, rotatable means within said ascending conduit adapted to reduce the acceleration of movement of ascending gas charged particles, a separating tank into which the top end of said ascending conduit opens, means for continuously withdrawing particles floated to water surface in said separating tank and means for removing the clear liquid from said separating tank.

ADOLF MAGNUS RUPERT KARLSTRÖM.